(12) United States Patent
Kwon

(10) Patent No.: US 9,274,794 B2
(45) Date of Patent: Mar. 1, 2016

(54) PROCESSOR AND INSTRUCTION PROCESSING METHOD IN PROCESSOR

(75) Inventor: Young-Su Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 772 days.

(21) Appl. No.: 13/608,774

(22) Filed: Sep. 10, 2012

(65) Prior Publication Data

US 2013/0080747 A1 Mar. 28, 2013

(30) Foreign Application Priority Data

Sep. 23, 2011 (KR) .......... 10-2011-0096566
Apr. 3, 2012 (KR) .......... 10-2012-0034337

(51) Int. Cl.
*G06F 9/00* (2006.01)
*G06F 9/30* (2006.01)
*G06F 9/32* (2006.01)
*G06F 9/38* (2006.01)

(52) U.S. Cl.
CPC ........ *G06F 9/30145* (2013.01); *G06F 9/30076* (2013.01); *G06F 9/328* (2013.01); *G06F 9/3802* (2013.01); *G06F 9/3808* (2013.01); *G06F 9/3844* (2013.01)

(58) Field of Classification Search
CPC .............................. G06F 9/3802; G06F 9/3844
See application file for complete search history.

(56) References Cited

U.S. PATENT DOCUMENTS

| 5,751,942 A * | 5/1998 | Christensen et al. ...... 714/38.13 |
| 6,898,693 B1 | 5/2005 | Singh et al. |
| 7,174,469 B2 | 2/2007 | Luick |
| 7,260,106 B2 | 8/2007 | Yavatkar et al. |
| 7,318,164 B2 | 1/2008 | Rawson, III |
| 7,568,086 B2 | 7/2009 | Ramchandran |
| 2006/0101206 A1 | 5/2006 | Wood et al. |
| 2008/0209243 A1 | 8/2008 | Ghiasi et al. |
| 2009/0037696 A1 | 2/2009 | Tanaka et al. |

FOREIGN PATENT DOCUMENTS

| JP | 2004-513427 A | 4/2004 |
| JP | 2009-104643 A | 5/2009 |
| KR | 10-2006-0034998 A | 4/2006 |

* cited by examiner

*Primary Examiner* — Zachary K Huson
(74) *Attorney, Agent, or Firm* — Rabin & Berdo, P.C.

(57) ABSTRACT

The present invention relates to a processor including: an instruction cache configured to store at least some of first instructions stored in an external memory and second instructions each including a plurality of micro instructions; a micro cache configured to store third instructions corresponding to the plurality of micro instructions included in the second instructions; and a core configured to read out the first and second instructions from the instruction cache and perform calculation, in which the core performs calculation by the first instructions from the instruction cache under a normal mode, and when the process enters a micro instruction mode, the core performs calculation by the third instructions corresponding to the plurality of micro instructions provided from the micro cache.

13 Claims, 2 Drawing Sheets

PROCESSOR AND INSTRUCTION PROCESSING METHOD IN PROCESSOR

CROSS-REFERENCES TO RELATED APPLICATIONS

The present application claims priority under 35 U.S.C. 119(a) to Korean Application Nos. 10-2011-0096566 and 10-2012-0034337, filed on Sep. 23, 2011 and Apr. 3, 2012, in the Korean Intellectual Property Office, which are incorporated herein by reference in their entirety set forth in full.

BACKGROUND

Exemplary embodiments relate to a processor and an instruction processing method in the processor, and more particularly, to a processor configured to improve the processing ability of the processor and save power by allowing a plurality of instructions, which are frequently executed or processed in the processor, to be simultaneously processed in a core for a single cycle, and an instruction processing method in the processor.

As Background Art related with the present invention, there is Korean Patent Registration No. 1996-0015584 (Nov. 18, 1996).

A processor means hardware configured to perform an algorithm for a specific application by reading out instructions stored in a memory or an external memory such as a disk, performing specific calculation on an operand in accordance with the operation encoded in the instruction, and storing the result again.

The application of the processor reaches wide field throughout the entire field of the system semiconductor. The application of the processor is variously increasing to high-performance media data processing of large-capacity multimedia such as compressing and releasing of video data, compressing and releasing of audio data, deforming of audio data, and sound effect, a wire/wireless communication modem, a voice codec algorithm, network data processing, a touch screen, a home appliance controller, a minimum-performance microcontroller platform such as motor control, wireless sensor network, and devices that cannot be supplied with stable power or power from the outside such as an electronics dust.

The processor basically includes a core, a translation lookaside buffer (TLB), and a cache. The work to be performed by the processor is defined by a combination of a plurality of instructions. That is, when instructions are stored in a memory and sequentially input to the processor, the processor performs specific calculation for each clock cycle. The translation lookaside buffer functions to convert a virtual address into a physical address in order to drive an application based on the operation system and the cache functions to increase the speed of the processor by temporarily storing the instructions, which are stored in an external memory, in a chip.

A common cache means a high-speed storage unit configured to temporarily store information between a processor having a relatively high processing speed and an external memory having a relatively low processing speed. The cache can increase the processing speed of a computer, using locality of reference when executing a shared program. That is, it is possible to observe that only one or two sections of the external memory are intensively accessed for a predetermined time when observing the addresses in the external memory that the processor accesses while a computer program is executed, which is called locality of space. It is possible to reduce the time that takes the processor to access an external memory by storing some sections of the external memory, which are frequently used, in a high-speed cache between the external memory and the processor, by using the property.

In other words, it takes the core of the processor a considerable time of generally 10 to 100 cycles to read out data from an external memory, which causes the core to remain an idle state without working for a long time. The cache is a unit achieved by storing instructions that the core frequently uses in a memory in a chip directly connected to the core and functions to reduce the time for the core to access the external memory. The cache functions to temporarily store instructions in the chip instead of a large-capacity external memory.

The cache has a considerable influence on the performance of the processor, and when the core requests a specific instruction and the instruction required by the processor is not in the cache, the core has to read out the instruction from the external memory, so that the cache has to be operated to have the instructions, which may be requested by the processor, as many as possible.

However, since power is consumed every time the core reads out an instruction from the cache, the cache has a considerable influence on the power consumption of the processor. In the related art, there was a problem in that the amount of consumed power increases because power is consumed every time even instructions that are frequently processed are read out from the cache, and as the core sequentially reads out the instructions from the cache, there is a limit in the processing ability of the processor.

SUMMARY

An embodiment of the present invention is directed to provide a processor configured to improve the processing ability of the processor and save power by allowing a plurality of instructions, which are frequently executed or processed in the processor, to be simultaneously processed in a core for a single cycle, and an instruction processing method in the processor.

An embodiment provide a processor including: an instruction cache configured to store at least some of first instructions stored in an external memory and second instructions each including a plurality of micro instructions; a micro cache configured to store third instructions corresponding to the plurality of micro instructions included in the second instructions; and a core configured to read out the first and second instructions from the instruction cache and perform calculation, in which the core performs calculation by the first instructions from the instruction cache under a normal mode, and when the process enters a micro instruction mode, the core performs calculation by the third instructions corresponding to the plurality of micro instructions provided from the micro cache.

When the core executes the instructions changing a processor mode register in the first instructions, the processor may enter the micro instruction mode.

When the processor enters the micro instruction mode, the core may provide the second instructions to the micro cache and the micro cache may convert the provided second instructions into the third instructions corresponding to the plurality of micro instructions included in the second instructions and outputs the third instructions to the core.

The plurality of micro instructions may indicate addresses where the corresponding third instructions are stored in the micro cache.

Each of the second instructions may include four micro instructions having an 8 bitwidth and each of the third instructions corresponding to the micro instructions may have a 32 bitwidth.

The core may include an instruction writing unit configured to store the third instructions corresponding to the addresses corresponding to the plurality of micro instructions in the micro cache.

The processor may search the instructions that are regularly or irregularly executed and update the third instructions to be stored in the micro cache based on the searched result.

Another exemplary embodiment of the present invention provides an instruction processing method of a processor including: receiving at least some of first instructions and second instructions each including a plurality of micro instructions from an instruction cache by a core; providing the second instructions to a micro cache from the core when the processor enters a micro instruction mode, and storing the third instructions corresponding to the plurality of micro instructions included in the second instructions in the micro cache; outputting the third instructions corresponding to the plurality of micro instructions to the core from the micro cache; and performing calculation in accordance with the third instructions by the core.

The outputting of the third instructions by the micro cache may include converting the second instructions into the third instructions corresponding to the plurality of micro instructions included in the second instructions by the micro cache and outputting the third instructions to the core.

The processor and the instruction processing method in the processor make it possible to improve the processing ability of the processor and save power by allowing a plurality of instructions, which are frequently executed or processed in the processor, to be simultaneously processed in a core for a single cycle.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
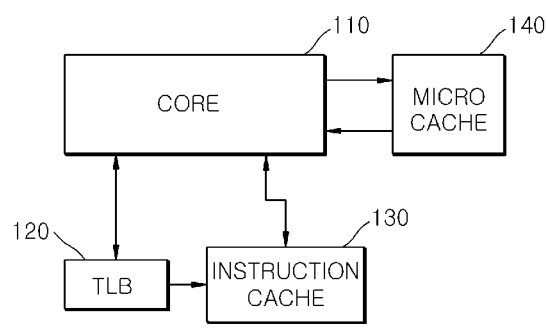
FIG. 1 illustrates the configuration of a processor in accordance with an exemplary embodiment of the present invention.

Hereinafter, exemplary embodiments of the present invention will be described in detail with reference to the accompanying drawings so that those skilled in the art may easily practice the present invention. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Through the present specification, unless explicitly described otherwise, "comprising" any components will be understood to imply the inclusion of other components rather than the exclusion of any other components.

Figure 2:
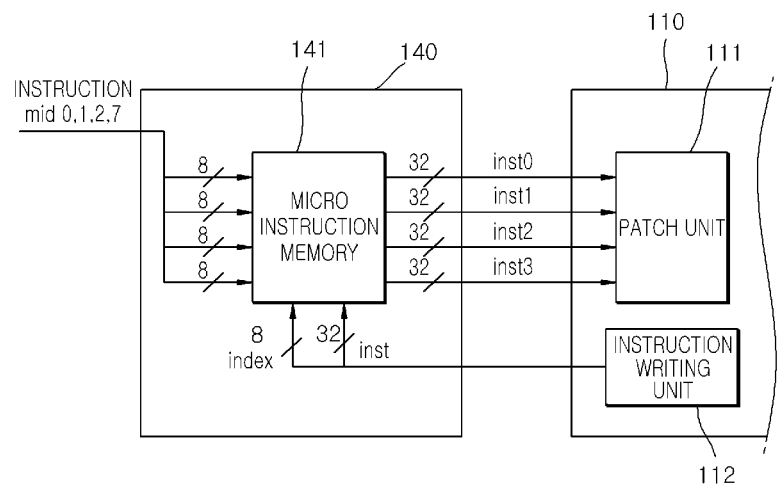
FIG. 2 is a brief diagram illustrating an instruction processing method between a core and a micro cache in the processor in accordance with the exemplary embodiment.
Figure 3:
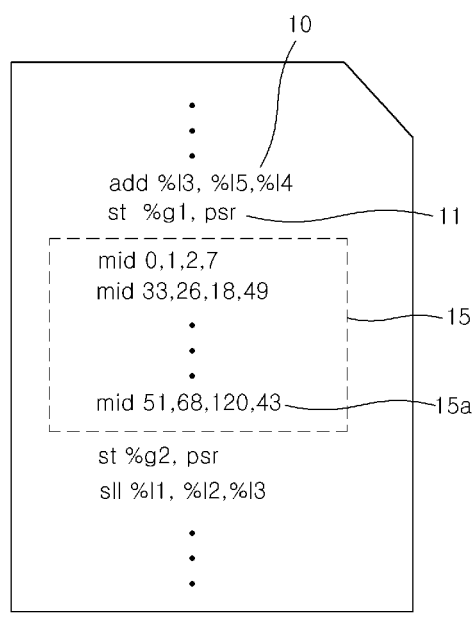
FIG. 3 illustrates instructions stored in an instruction cache of the processor in accordance with the exemplary embodiment.

FIG. 1 illustrates the configuration of a processor in accordance with an exemplary embodiment of the present invention, FIG. 2 is a brief diagram illustrating an instruction processing method between a core and a micro cache in the processor in accordance with the exemplary embodiment, and FIG. 3 illustrates instructions stored in an instruction cache of the processor in accordance with the exemplary embodiment. The present invention will be described below with reference to FIGS. 1 to 3.

As illustrated in FIGS. 1 to 3, a processor according to an exemplary embodiment of the present invention includes: an instruction cache 130 configured to store at least some of first instructions 10 stored in an external memory (not illustrated) and second instructions 15 each including a plurality of micro instructions; a micro cache 140 configured to store third instructions inst0~inst3 corresponding to the plurality of micro instructions included in the second instructions 15; and a core 110 configured to read out the first and second instructions 10 and 15 from the instruction cache 130 and perform calculation.

The core 110 performs calculation by the first instructions 10 from the instruction cache 130 under a normal mode, and when the process enters a micro instruction mode, the core 110 performs calculation by the third instructions inst0~inst3 corresponding to the plurality of micro instructions provided from the micro cache 140.

When the processor enters the micro instruction mode, the core 110 provides the second instructions 15 to the micro cache 140 and the micro cache 140 replaces or converts the provided second instructions 15 with or into the third instructions inst0~inst3 corresponding to the plurality of micro instructions included in the second instructions 15 and outputs the third instructions to the core 110.

In particular, each of the second instructions 15 may include four micro instructions having an 8 bitwidth and the third instructions inst0~inst3 corresponding to the micro instructions may have 32 bitwidth.

The core 110 may include an instruction writing unit 112 configured to store the third instructions inst0~inst3 corresponding to the addresses corresponding to the plurality of instructions in the micro cache 140.

The movement and operation of the present exemplary embodiment having the configuration described above are described in detail with reference to FIGS. 1 to 3.

The core 110 in FIG. 1 is a unit configured to read various instructions and perform calculation of the processor. The translation lookaside buffer (TLB) 120 is a unit configured to convert a virtual address into a physical address. Further, the instruction cache 140 is a device configured to store some of program codes stored in an external memory (not illustrated) and is a unit for reading out various instructions at a high speed.

The micro cache 140 proposed in the exemplary embodiment is a unit connected to the core 110, and described below, functions to provide regular instructions, which are stored to correspond to the instructions provided from the core 110 under a micro instruction mode, to the core 110. The core writes the contents to be stored in the micro cache 140 through a micro instruction write bus. Further, the core 110 reads the instructions through a micro instruction read bus when the present operation mode of the processor is the micro instruction mode.

As illustrated in FIG. 3, the instruction cache 130 stores at least some instructions of the first instructions stored in an external memory (not illustrated) and the second instructions 15 configured by each including a plurality of micro instructions. The first instructions 10 mean regular instructions that are calculated or processed in the processor. Further, the micro instructions included in each of the second instructions 15 are not regular instructions, but instructions that function as indexes for reading out the third instructions inst0~inst3 that are corresponding instructions stored in the micro cache 140 under the micro instruction mode.

The instructions stored in the instruction cache 130 generally have a bitwidth of 32 bit and sets the kind of calculation, the operand, and a flag setting method.

Under the normal mode, the core 110 reads out the first instructions 10 that are regular instructions stored in the instruction cache 130 and performs corresponding specific calculation. That is, the core 110 performs calculation by the same operation mechanism as in a common processor configured to sequentially read the first instructions 10, which are regular instructions stored in the instruction cache 130, under the normal mode, and perform specific calculation.

However, in the exemplary embodiment, when the core 110 reads out an instruction (psr) 11 that is an instruction changing a processor mode register from the instruction cache 130 and performs the instruction, the operation mode of the processor enters the "micro instruction mode". The micro instruction mode means a mode that reads out the corresponding third instructions inst0~inst3 by using the micro instructions included in the second instruction 15 of the exemplary embodiment and performs calculation.

When the operation mode of the processor enters the micro instruction mode, the core 110 recognizes 32 bit of the second instructions 15 input from the instruction cache 130 as a micro bit, four micro instructions of 8 bit are included in each of the second instructions 15. The micro instructions of 8 bit is replaced with the third instructions inst0~inst3 of 32 bit by the micro cache 140 and output to the core 110. That is, the core 110 reads out the second instructions 15, which are 32 bit data, from the instruction cache 130 and provides the second instructions to the micro cache 140 and the micro cache 140 outputs the third instructions inst0~inst3 of 32 bit corresponding to the micro instructions of 8 bit to the core 110. That is, as the micro instructions of 8 bit included in the second instructions 15 are replaced with the third instructions inst0~inst3 of 32 bit, four 32 bit instructions are processed at one time.

The process of processing the micro instructions by the core 110 and the micro cache 140 will be described in more detail with reference to FIG. 2. The first instructions 10 and the second instructions 15 read out from the instruction cache 130 in the exemplary embodiment have a bitwidth of 32 bit. When the operation mode of the processor enters the micro instruction mode, the second instructions of 32 bit mid 0, 1, 2, and 7 are read from the instruction cache 130 and divided into four micro instructions by 8 bit and input to the micro cache 140, as illustrated in FIG. 2.

The micro instructions of 8 bit become the addresses of the micro instruction memory 141 in the micro cache 140. The micro instructions of 8 bit may designate 256 different elements in the micro instruction memory 141. That is, the micro instruction of 8 bit may be used an indexes of the memory element of the micro instruction memory 141.

Regular third instructions inst0~inst3 of 32 bit are stored in the micro instruction memory 141 of the micro cache 140, corresponding to the micro instructions of 8 bit. The micro instructions of 8 bit are addresses and the micro instruction memory 141 outputs four third instructions inst0~inst3 of 32 bit for each of the micro instructions of 8 bit. The output four third instructions inst0~inst3 of 32 bit are input to a patch unit 111 of the core 110, that is, a unit the reads out instructions, as instructions of the processor. The core 110 reads out the third instructions inst0~inst3 that are input as described above and performs corresponding calculation.

When the third instruction corresponding to a specific micro instruction 15a for mode return illustrated in FIG. 3 is performed by the core 110 after the third instructions replaced under the micro instruction mode described above are performed, the operation mode of the processor is converted into a normal mode that is a general state from the micro instruction mode. When the operation mode is converted into the normal mode, the core 110 performs again calculation in accordance with the regular first instructions 10 stored in the instruction cache 130.

Meanwhile, the third instructions should be input in the micro instruction memory 141 of the micro cache 140, corresponding to the micro instruction described above, before the processor enters the micro instruction mode. For this configuration, the core 110 includes the instruction writing unit 112, as illustrated in FIG. 2. The instruction writing unit 112 is a unit configured to write the third instructions to the addresses or the positions corresponding to the micro instructions and writes the indexes designating the positions where the third instructions of 32 bit are stored and the corresponding third instructions inst of 32 bit onto the micro instruction memory 141 through a micro instruction update bus.

The processor searches the instructions that are regularly or irregularly executed and may update the third instructions to be stored in the micro cache 140 on the basis of the searched result. Inputting of updating the third instructions may be regularly, irregularly, and automatically performed or performed in accordance with a request of a user.

Further, although it is described above that the regular instruction is 32 bit and the micro instruction is 8 bit, the bitwidths of the regular instructions and the micro instructions are not limited thereto, and instructions of various bitwidths may be applied in accordance with the environment of the system or the processor.

As described above, the processor and the instruction processing method in the processor according to the exemplary embodiment make is possible to save power and improve the processing ability of a processor by allowing a plurality of instructions, which are frequently executed or processed in the processor, to be simultaneously processed in a core for a single cycle, using micron instructions.

Although an exemplary embodiment of the present invention was described in detail above, the scope of the present invention is not limited thereto and various changes and modifications by those skilled in the art using the basic concept of the present invention which is defined in the following claims are included in the scope of the present invention.

What is claimed is:

1. A processor, comprising:
an instruction cache configured to store at least a first instruction read from an external memory and a second instruction, the second instruction being dividable into a plurality of pieces, each piece being a micro instruction;
a micro cache configured to store a plurality of third instructions corresponding to the plurality of micro instructions included in the second instruction; and
a core configured to read out the first and second instructions from the instruction cache and perform calculation, wherein the core
performs the calculation using the first instruction from the instruction cache in a normal mode, and performs the calculation using the plurality of third instructions corresponding to the plurality of micro instructions provided from the micro cache in a micro instruction mode.

2. The processor of claim 1, wherein when the core executes the first instruction to change a processor mode register, the processor enters the micro instruction mode.

3. The processor of claim 1, wherein when the processor enters the micro instruction mode, the core provides the second instruction to the micro cache and the micro cache converts the provided second instruction into the third instructions corresponding to the plurality of micro instructions included in the second instruction and outputs the third instructions to the core.

4. The processor of claim 3, wherein the plurality of micro instructions indicate addresses where the corresponding third instructions are stored in the micro cache.

5. The processor of claim 3, wherein
the second instruction is dividable into four pieces, each piece being a micro instruction having a width of 8 bits, and
each of the third instructions has a width of 32 bits.

6. The processor of claim 3, wherein the core includes an instruction writing unit configured to store the third instructions in the micro cache.

7. The processor of claim 6, wherein the processor searches an instruction that is regularly or irregularly executed and updates the third instructions to be stored in the micro cache based on the searched result.

8. An instruction processing method of a processor, comprising:
receiving, by a core, at least a first instruction and a second instruction from an instruction cache, the second instruction being dividable into a plurality of pieces, each piece being a micro instruction;
providing the second instruction to a micro cache from the core when the processor enters a micro instruction mode, the micro cache having a plurality of third instructions, each corresponding to one of the plurality of micro instructions, stored therein;
outputting the plurality of third instructions corresponding to the plurality of micro instructions to the core from the micro cache; and
performing calculation in accordance with the plurality of third instructions by the core.

9. The method of claim 8, wherein when the core executes the first instruction to change a processor mode register, the processor enters the micro instruction mode.

10. The method of claim 8, wherein the outputting the plurality of third instructions from the micro cache includes converting the second instruction into the third instructions corresponding to the plurality of micro instructions included in the second instruction by the micro cache and outputting the plurality of third instructions to the core.

11. The method of claim 10, wherein the plurality of micro instructions indicate addresses where the corresponding third instructions are stored in the micro cache.

12. The method of claim 10, wherein
the second instruction is dividable into four pieces, each piece being a micro instruction having a width of 8 bits, and
each of the third instructions has a width of 32 bits.

13. The method of claim 10, wherein the processor searches an instruction that is regularly or irregularly executed and updates the third instructions to be stored in the micro cache based on the searched result.

\* \* \* \* \*